United States Patent
Rajasekaran et al.

(10) Patent No.: US 6,908,030 B2
(45) Date of Patent: Jun. 21, 2005

(54) ONE-TIME CREDIT CARD NUMBER GENERATOR AND SINGLE ROUND-TRIP AUTHENTICATION

(75) Inventors: Sanguthevar Rajasekaran, Los Altos, CA (US); Rammohan Varadarajan, Cupertino, CA (US)

(73) Assignee: Arcot Systems, Inc., Santa Clara, CA (US)

( * ) Notice: Subject to any disclaimer, the term of this patent is extended or adjusted under 35 U.S.C. 154(b) by 0 days.

(21) Appl. No.: 10/003,847

(22) Filed: Oct. 31, 2001

(65) Prior Publication Data

US 2003/0080183 A1 May 1, 2003

(51) Int. Cl.[7] ............................................... G06F 17/60
(52) U.S. Cl. ...................................................... 235/379
(58) Field of Search ................................. 235/379, 380; 705/44, 67; 713/155, 168, 170; 709/229

(56) References Cited

U.S. PATENT DOCUMENTS

| | | | |
|---|---|---|---|
| 4,995,082 A | | 2/1991 | Schnorr |
| 5,495,533 A | * | 2/1996 | Linehan et al. ............. 713/155 |
| 5,657,388 A | * | 8/1997 | Weiss ......................... 713/185 |
| 5,729,537 A | * | 3/1998 | Billstrom .................... 370/329 |
| 5,794,139 A | * | 8/1998 | Mizikovsky et al. ....... 455/403 |
| 6,000,832 A | | 12/1999 | Franklin et al. |
| 6,029,890 A | | 2/2000 | Austin |
| 6,061,346 A | * | 5/2000 | Nordman .................... 370/352 |
| 6,076,069 A | * | 6/2000 | Laor ............................. 705/14 |
| 6,317,838 B1 | * | 11/2001 | Baize ......................... 713/201 |
| 6,467,684 B2 | * | 10/2002 | Fite et al. ................... 235/379 |
| 6,490,682 B2 | * | 12/2002 | Vanstone et al. ........... 713/171 |

OTHER PUBLICATIONS

Schneier, Bruce, "Applied Cryptography, Second Edition: Protocols, Algorithms, and Source Code in C," 1996, pp. 508–512.

* cited by examiner

*Primary Examiner*—Thien M. Le
*Assistant Examiner*—Lisa M. Caputo
(74) *Attorney, Agent, or Firm*—Townsend and Townsend and Crew LLP (57) ABSTRACT

An online transaction is effected between a user system, a merchant system and an issuer system. The user system generates a one-time number (OTN) to use as a card number for a transaction with the merchant. The user system generates the OTN as a function of various parameters and sends the OTN to the issuer and to the merchant. With the issuer communication, the user is first authenticated, so the issuer can associate the received OTN with the user even if the user's identity cannot be fully discerned from the OTN alone. In authenticating the user with the issuer, and possibly other authentications, the user sends the issuer a signed challenge where the challenge is a sequential challenge or a function of a prior challenge provided by the issuer. The issuer responds with an approval/denial message and, in the latter case, includes the next challenge to be used.

8 Claims, 8 Drawing Sheets

ONE-TIME CREDIT CARD NUMBER GENERATOR AND SINGLE ROUND-TRIP AUTHENTICATION

FIELD OF THE INVENTION

The present invention relates to transaction processing in general and more particularly to the use of one-time numbers and authentication.

BACKGROUND OF THE INVENTION

With the use of the Internet becoming commonplace, online purchases have also become widespread. In a typical transaction, a user makes a purchase from a merchant using a financial vehicle. The user can be a person or a nonperson business entity, agency or organization. The merchant can be an established product seller or reseller, a broker, a service provider or an individual or business entity making a single or a few transactions, such as an auction participant. The financial vehicle can be a credit card, debit card, electronic credit, digital cash, person-to-person payment or the like. As an example, an individual might use a credit card to purchase a book from an online bookstore.

Since the transaction is online, it is often more precise to refer to a user computer system, a merchant computer system and an issuer computer system. Thus, for a transaction to take place, the user computer system connects to the merchant computer system and interacts, then the user computer system and/or the merchant computer system connects to the issuer computer system and interacts, with the merchant computer system typically interacting with the issuer computer system, if at all, through an acquirer computer system that in turn interacts with the issuer computer system via a payment network, such as the VISANET(™) network operated by Visa International. In card systems, "issuer" is the term typically used to refer to the entity that issues a card (or a card number) to a user for the purpose of making purchases upon presentation of the card or the card number. Typically the entity is a bank or other financial institution or an agent of a bank or financial institution. The term "acquirer" refers to the entity that accepts the transaction details from the merchant and effects a transfer of funds from the issuer to the acquirer on behalf of the merchant. In some cases, the issuer and acquirer might be the same entity. The systems might be large computer processing systems, personal computers, handheld devices, wireless devices, cellular telephones with data capability, or other computing devices.

One increasingly common method of connection and interaction is via the Internet, a global internetwork of networks in common use today. Of course, as the Internet changes, the resulting networks might also carry such traffic. One concern with traffic over the Internet is that data can be intercepted and parties to a transaction can be impersonated. In addition, since a merchant can easily set up an online business, someone with the intent to defraud cardholders and issuers might set up a business, engage in transactions and then use the card numbers provided by users for unauthorized transactions. Another concern with online transactions is that an unauthorized system might pose as a user system and effect a transaction to the benefit of the operator of the unauthorized system.

One-Time Cards

One approach to preventing, or at least reducing, credit card fraud is to issue one-time card numbers to users. With this approach, each user might be assigned a permanent card number, but that permanent card number is not given to the merchant. Instead, a one-time card number is generated and given to the merchant. Since the one-time card number can only be used for that one transaction, that prevents unauthorized persons or entities from initiating another, unauthorized transaction using that number. The user can generate the one-time number or the issuer can generate it and provide it to the user for use with the merchant. The one-time number ("OTN") might be generated as a function of details of the transaction, such as the permanent card number, the transaction amount, transaction date, time, merchant identifier, etc. If the OTN is a function of the permanent card number, preferably the function is a one-way function so that the permanent card number cannot be determined from just the OTN. In some designs, a permanent card number might be determinable with enough time and computing power, but it should be understood that a system that was breakable but required enough time or computing power to eliminate the usefulness or economic benefit of the break is effectively equivalent to an unbreakable system. Of course, a "permanent" card number need not be permanent for all time. Thus, it should be understood that, herein, "permanent card number" refers to a number such as a credit card number assigned by an issuer to its customer, the user, for use over an indefinite period of time for an indefinite number of transactions. One example of a permanent card number is a credit card number assigned to a user that is embossed on a card held by the user.

Where the permanent card number is used instead of OTNs, there is an opportunity for a merchant to cheat (e.g., by charging the user repeatedly for a single transaction) and for an interloper to cheat (e.g., by eavesdropping on the user-merchant interaction, gaining the permanent card number and using that in transactions with that merchant or other merchants). When a user wants to participate in a transaction with a merchant, the issuer or the user generates the OTN, so the permanent card number need never be sent to the merchant. In some arrangements, the OTNs are such that they can be used in the same payment networks as are used for transactions using the permanent credit card numbers. Thus, in some cases, the merchant and other handlers of the OTNs will not be able to distinguish between a OTN and a permanent card number. However, in some implementations, mechanisms exist in appropriate places in the payment network to distinguish an OTN from a permanent card number.

Several schemes have been proposed in the literature for generating and handling OTNs, but typically such schemes require too much runtime effort (leading to transaction delays for the users), do not scale well, or both.

One scheme is the Microsoft online commerce system scheme. With that approach there are three phases: 1) a registration phase, 2) a transaction phase, and 3) a payment authorization phase. During the registration phase, the issuer supplies the user (the issuer's customer) with an account number, such as the permanent card number as described above, and a private key. The user system maintains those data as secrets of the user. The issuer also supplies the user with a software module that controls OTN generation. The issuer maintains a record of the user's account number and corresponding private key, typically in a user database.

Once registered, the user can effect a transaction. The transaction phase occurs when the user initiates an online transaction. To do this, the user invokes the software module supplied by the issuer and the module prompts for a password or performs some other authentication of the user. Upon entering the correct password or otherwise verifying identity, the user system can then access the secret information (including the private key). Subsequently, the software module generates a OTN, which in this case is a credit card number usable only once. The number is a function of the user's account number, the user's private key, the time of transaction, transaction amount, merchant ID, and possibly other data.

As part of the transaction process, the user sends the OTN to the merchant as a proxy for the user's account number. The OTN in this scheme is such that it appears to the merchant to be a valid credit card number. This feature allows the merchant to use existing payment networks to process the transaction. Of course, since the number is valid for only one transaction, if the number is presented again to the issuer, either by the merchant or an interloper, the issuer will reject the transaction and no funds will change hands.

Figure 1:
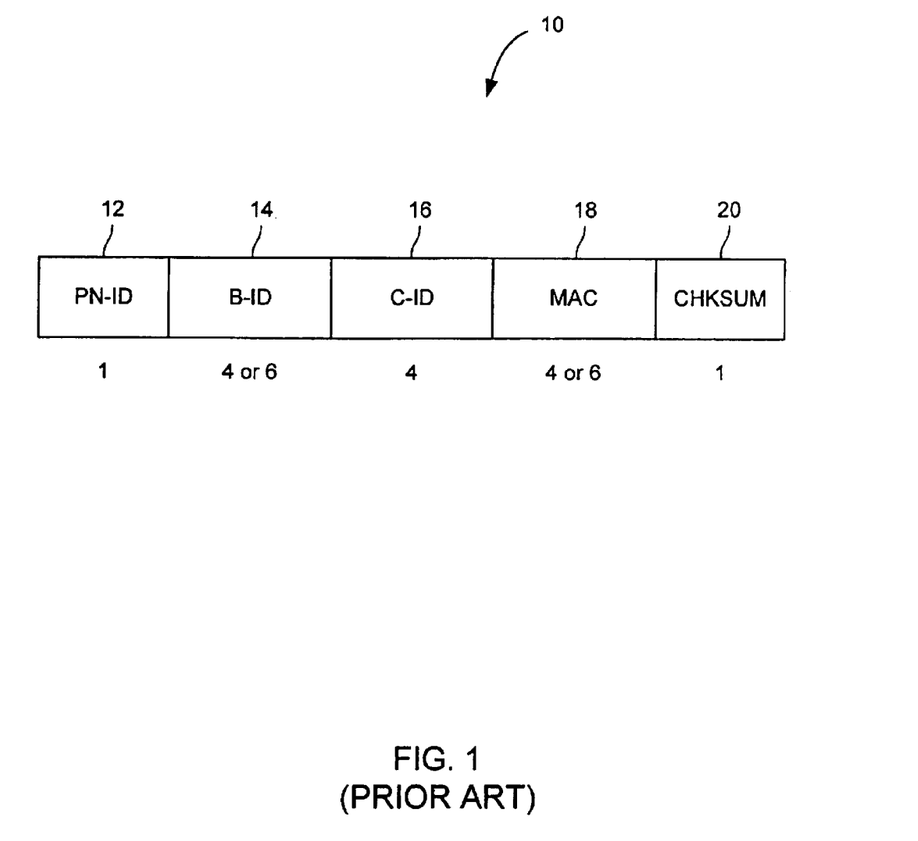
FIG. 1 illustrates a known format for a one-time number.

In this specific scheme, the OTN 10 is a 16-digit number, like other credit and debit card numbers, and is divided into fields as shown in FIG. 1. As shown, the first field 12 is one digit indicative of the payment system used by the issuer with that user. By way of example, "3" indicates one payment system "4" indicates another payment system, "5" indicates yet another, "6" indicates another, etc. The second field 14 is four to six digits that are associated with the particular issuer. The third field 16 is four digits that are associated with the particular user. The first three fields (9 to 11 digits) do not change from transaction to transaction. The last digit 20 is a checksum value dependent on the first fifteen digits, so there are only four to six digits that can change independently from transaction to transaction. Those four to six digits are referred to as a "Message Authentication Code" or "MAC" 18. The MAC can be a cryptographic hash of transaction parameters, such as those mentioned above.

During the payment authorization phase, the merchant submits an authorization request to the issuer over an existing payment network. The request includes a transaction number and other transaction-specific data. If the issuer identifies the transaction number supplied by the merchant as a OTN, the issuer relates that OTN to a user using the third (and possibly the second and first) fields of the OTN. The issuer then computes a MAC as a function of the known customer specific data, transaction specific data and the private key of that user. The hash function used would be the same one used by the user to generate the MAC in the OTN provided to the merchant. If this issuer-generated MAC matches the one in the OTN by the merchant, then the issuer accepts the authorization request and processes the transaction internally using the user's permanent card number or other user identifier. Replies to the merchant would use the OTN rather than the user's permanent card number.

Figure 2:
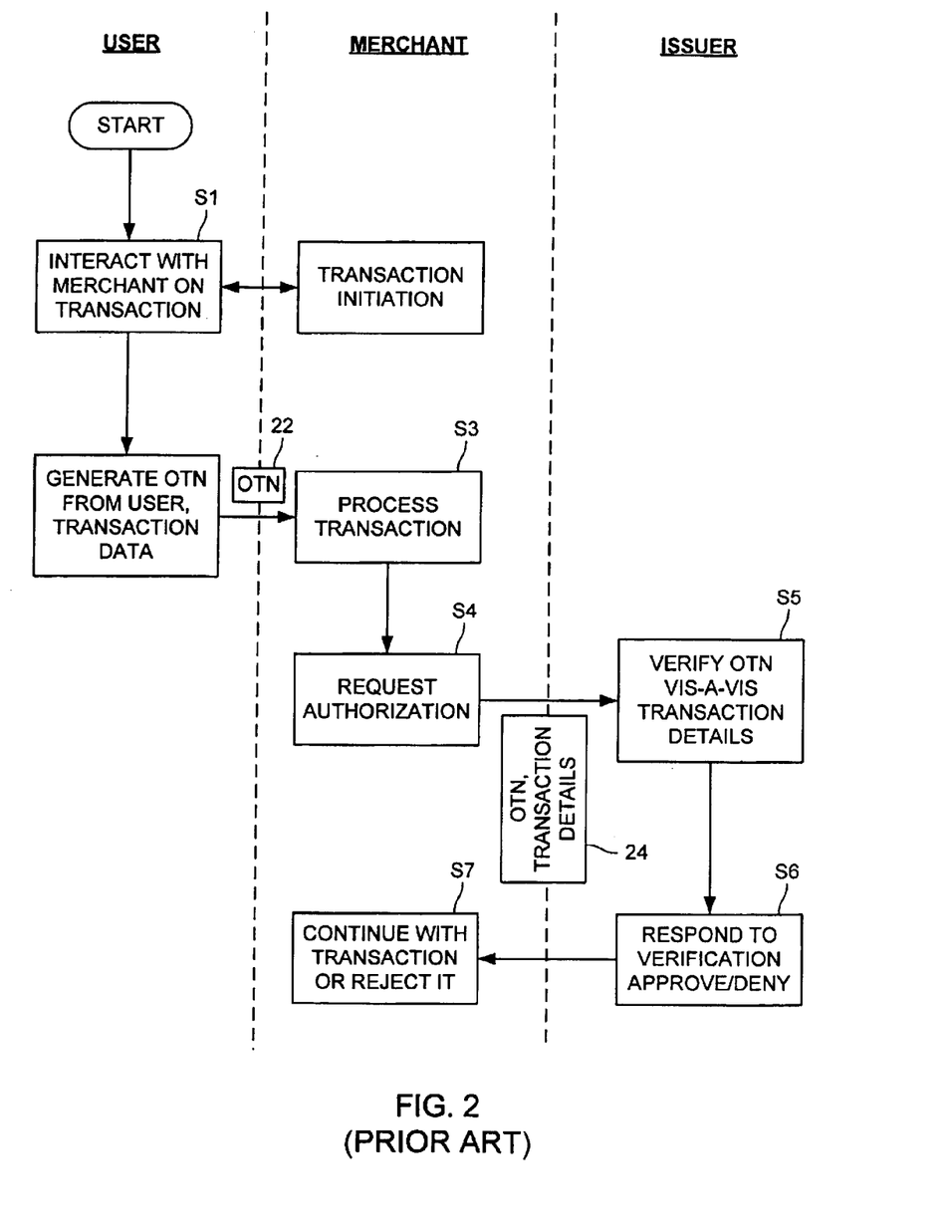
FIG. 2 is a swim diagram illustrating a known process for using a one-time number in an online transaction wherein in the one-time number codes for the user that generated the one-time number.

A more general description of such an online transaction is shown in the swim diagram of FIG. 2, which illustrates interactions between a user system, a merchant system and an issuer system. The steps of the swim diagram are labeled "S1", "S2", "S3", etc. As shown there, the user interacts with the merchant to define parameters of the transaction, such as what products or services would be purchased, quantities, and the like (step S1). The user system generates a one-time number 22 from user and transaction data and sends that one-time number to the merchant system (S2). The merchant system then uses that number to request the authorization (S3) and to begin the payment process with the issuer. The one-time number encodes for the user identification, as well as being a function of transaction details. Once the issuer receives a request (S4) from the merchant, the issuer system can verify the validity of the OTN relative to the transaction details 24 used to generate that OTN (S5). Since the OTN encodes for the user ID, the issuer can determine which user is party to the transaction. If the one-time number encodes for a valid user ID and correctly encodes for the selected transaction details, and sufficient funds are available to the identified user, then the issuer responds to the merchant's authorization request with an approval (S6). The merchant then proceeds with the transaction and notifies the user as needed (S7).

The above scheme does not scale well, as only 10,000 distinct customers of a given issuer can be supported since only four digits are usable for customer identification. The above scheme also has a problem in that the probability of fraud is not greatly reduced. Since only four to six digits are allocated for the MAC, a dishonest merchant or interloper can easily generate all the ten thousand to one million possible MACs and submit fraudulent transactions and some of them will be accepted. A merchant that processes one legitimate transaction can use the received OTN as a starting point to generate an unauthorized transaction and submit the transaction to an issuer. On average, if a merchant automatically generates a large number of such unauthorized transactions, as many as one per 10,000 unauthorized transactions will succeed.

Figure 3:
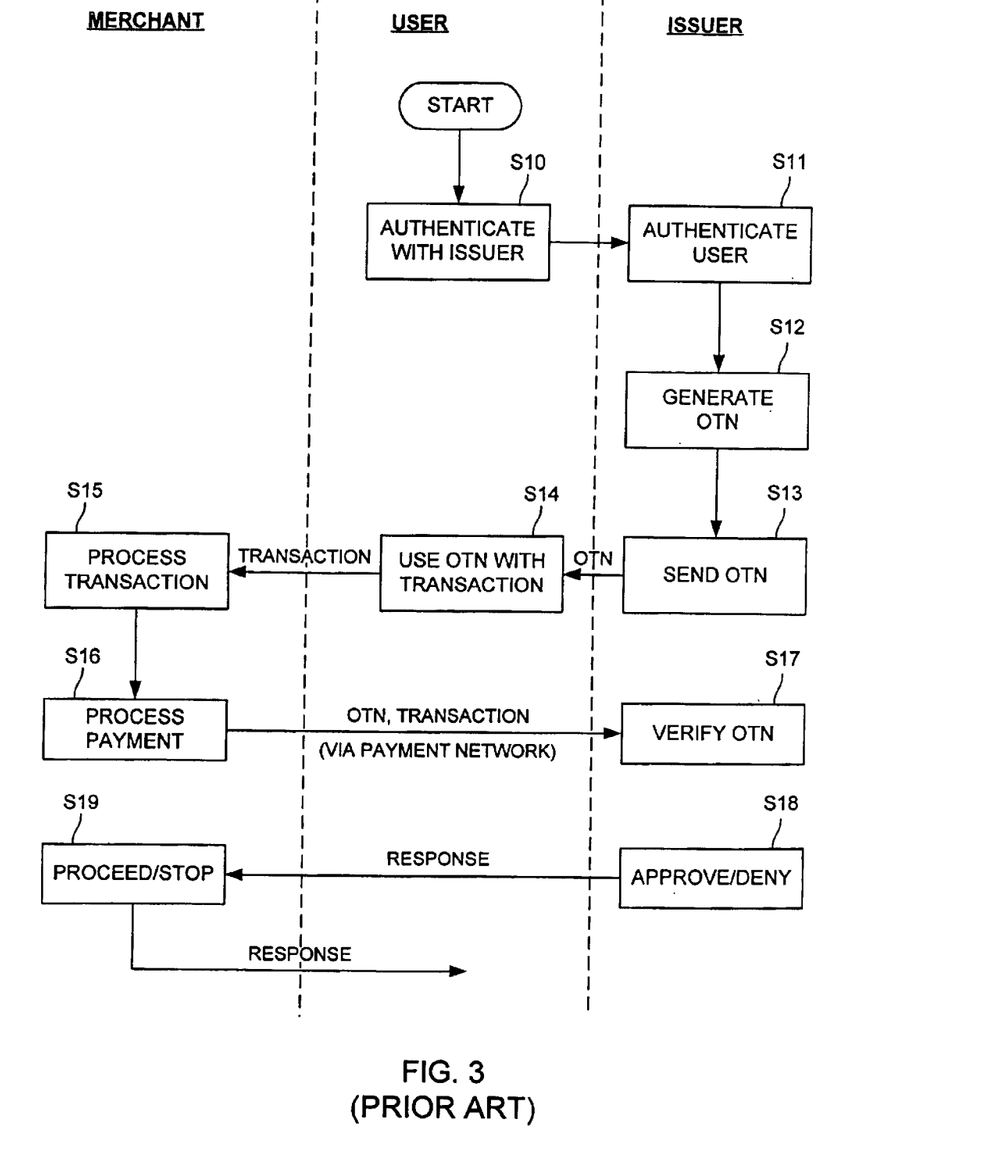
FIG. 3 is a swim diagram illustrating a process for using a one-time number for an online transaction, wherein a one-time number is generated by an issuer system.

Other OTN card schemes provide more protection against fraud, such as the issuer-generated numbers used by some companies, such as Orbiscom. FIG. 3 is a swim diagram of such a scheme. With this scheme, the OrNs do not necessarily match fields with the user's permanent number, which allows for more variability in the MAC. As with the Microsoft scheme, each user system includes software provided to handle OTN generation. In the issuer-generated approach, however, the user authenticates with the issuer (S10, S11) and the issuer generates the OTN (S12). The OTN may encode for other capabilities, such as a transaction value or time limit, or for limitation to a specific merchant.

Once the user system obtains the OTN (S13), the user sends the OTN to the merchant along with other transaction details (S14). The merchant processes the transaction in the normal way (S15) using the desired payment network and forwards the OTN and other details to the merchant's acquirer (i.e., sends a message to a payment network). The acquirer then sends the OTN and transaction amount to the issuer, directly or indirectly (S16). The issuer then associates the OTN with the appropriate customer and proceeds with the transaction (S17). After processing the request, the issuer either approves or declines the transaction and sends the response to the acquirer (S18). The acquirer forwards the response to the merchant and the merchant notifies the customer as to whether the transaction has been approved or declined (S19).

In specific embodiments, the issuer issues an OTN wherein the first five digits identify the issuer and ten digits can independently vary between OTNs for any given customer. Since the issuer generates the OTN and presumably stores the OTN in association with the user that requested the OTN, the issuer can reassociate that OTN with that customer when the OTN is received from the merchant without having to determine the customer from the contents of the OTN. This leaves more digits of the OTN available for the MAC, which in turn allows a given numbering scheme (e.g., 16 digit decimal numbers with one digit being a checksum) to support more distinct users and lower the probability of valid numbers being generated without full knowledge of the user data.

While the issuer-generated scheme is more scalable and deflects more fraud attempts, it has its own difficulties. Since the issuer generates the OTN, the user has to wait until the OTN is returned from the issuer before proceeding with a transaction and such a delay might not be acceptable. If the issuer system is tied up or is not immediately responsive, the user may choose to abandon the transaction altogether.

Online Authentication

Online transactions often expect parties to authenticate themselves to other parties. For example, a user system might be expected to authenticate itself to an issuer system before the issuer system would accept an OTN and transaction from the user system. Generally, authentication involves a client proving to a server that the client has the authority it claims to have, usually by responding to a challenge that indicates that the client has information that only an authorized party is supposed to have. Such information might be passwords, passwords with one-way functions, passwords with salts, SKEY data, digital signatures, etc. In a typical operation, the client requests authorization, the server responds with a challenge, the client responds with a response to the challenge and the server responds with either approval or denial of the authentication based on whether the response to the challenge was correct.

In a specific implementation, the client has a private key and a matching public key. The client sends an authorization request to the server and the server responds with a challenge, such as a random string. The client then encrypts or signs the challenge with the client's private key and sends the result to the server. The server uses the public key of the client to decrypt or verify the client's message. The server can access the public key of the client in one of many ways: the public key could be in the database of the server, or the public key could be sent by the client to the server (as a certificate for instance), etc. If the decrypted message is the same as the challenge sent by the server or the signature is verified, the client is deemed authenticated. If not, the client is denied authentication.

This typical authentication process involves two round-trips, resulting in delays to the client and possible stalls if the client-server connection stalls. In many cases, time spent at a transaction determines whether the user will complete the transaction, so it is important that the user not have to wait for the transaction to proceed.

BRIEF SUMMARY OF THE INVENTION

In one embodiment, an online transaction is effected between a user system, a merchant system and an issuer system. The user system generates a one-time number (OTN) to use as a card number for a transaction with the merchant. The user system generates the OTN as a function of various parameters and sends the OTN to the issuer and to the merchant. With the issuer communication, the user is first authenticated, so the issuer can associate the received OTN with the user even if the user's identity cannot be fully discerned from the OTN alone.

In authenticating the user with the issuer, and possibly other authentications, the user sends the issuer a signed challenge where the challenge is a sequential challenge or a function of a prior challenge provided by the issuer. The issuer responds with an approval/denial message and, in the latter case, includes the next challenge to be used.

Other features and advantages of the invention will be apparent in view of the following detailed description and preferred embodiments.

DETAILED DESCRIPTION OF THE INVENTION

One-Time Cards

A novel one-time card scheme is described below that overcomes at least some of the shortcomings of previously used schemes.

Figure 4:
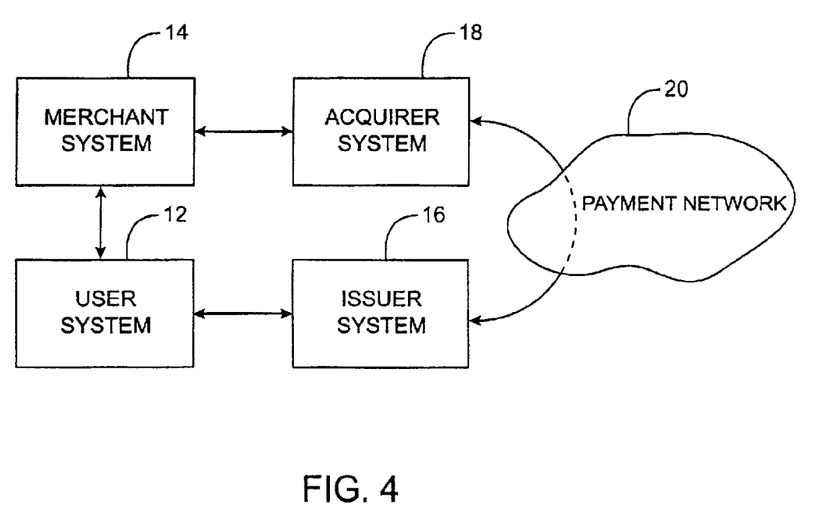
FIG. 4 is a block diagram of various systems as might interact to affect an online transaction.

FIG. 4 will be used to illustrate the interactions of various systems to affect an on-line transaction. As shown there, a user system 12 is coupled to a merchant system 14 and an issuer system 16. In the general case, it is expected that many distinct user systems would be coupled to a given merchant system and a given user system could couple to many different merchant systems. The coupling between a user system 12 and merchant system 14 could be via the Internet, via a dial up line, or other data communication means. User system 12 is coupled to issuer system 16 via the same or different data communication pathways as exists between user system 12 and merchant system 14. Although only issuer system 16 is shown, it should be understood a given user system might be able to select among a plurality of issuer systems on a transaction-by-transaction basis. It should also be understood that a given issuer system might be coupled to multiple independent user systems. In a typical arrangement, user system 12 is coupled to an issuer system 16 that is associated with a card or credit issuer having a relationship with the user of user system 12.

Merchant system 14 is coupled to an acquirer system 18, wherein the particular acquirer's system is typically a system operated by an acquirer having a preexisting relationship with the merchant operating merchant system 14. In a specific embodiment, a user is a consumer with a credit card relationship to the issuer operating issuer system 16 and the acquirer operating acquirer system 18 is the bank or financial institution that handles credit card payments for the merchant. The issuer system 16 and acquirer system 18 communicate over a payment network 20, which may be an existing conventional payment network, such as VISA-NET™ payment network.

Figure 5:
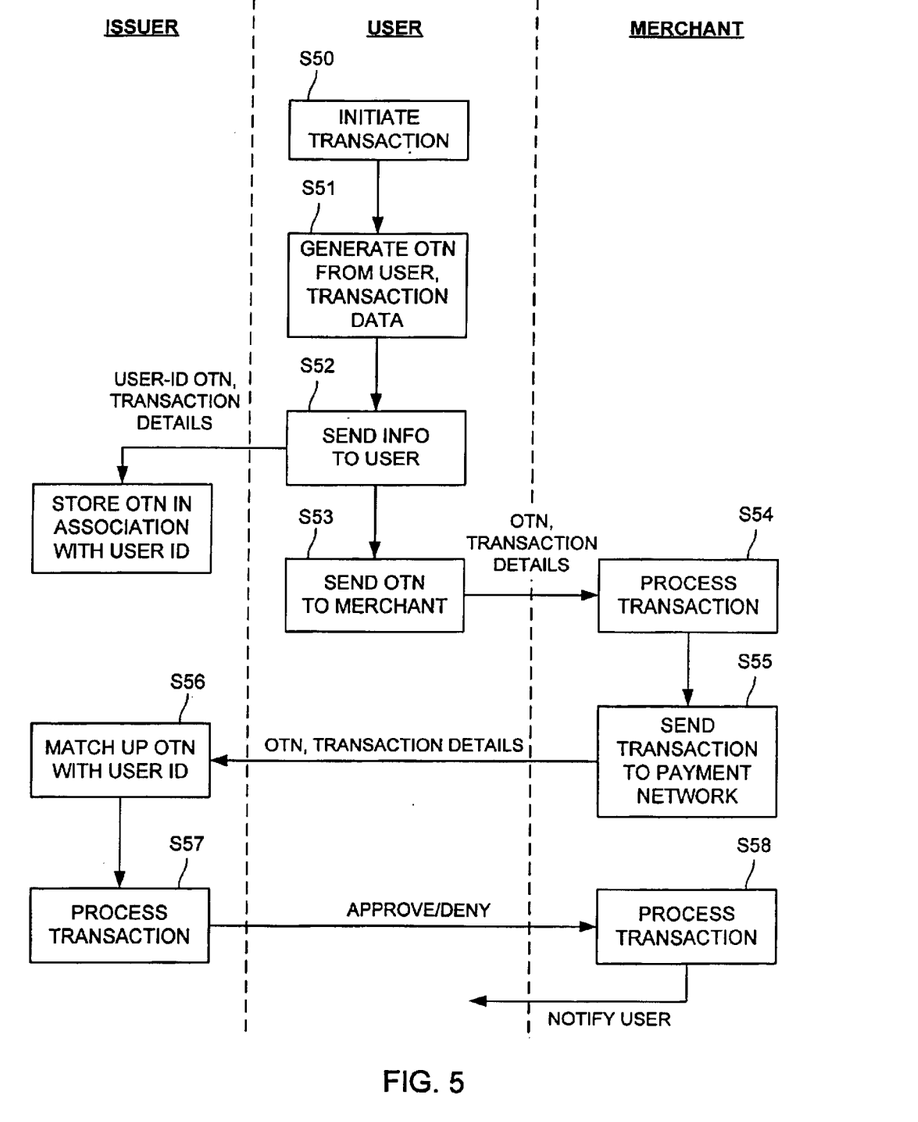
FIG. 5 is a swim diagram illustrating a process for affecting an online transaction using a one-time number according to one embodiment of the present invention.

FIG. 5 is a swim diagram illustrating a novel process for using one-time numbers for online transactions according to one embodiment of the present invention. A typical transaction begins when a user begins to interact with a merchant to select and provide details for a particular transaction. For example, the user may direct the user's browser to a merchant's web server and browse web pages thereon. Such merchant web pages might comprise an online catalogue with payment and check capability. To initiate the transaction (S50), the user generates a one-time number from user and transaction data (S51). As illustrated by the exemplary one-time number format shown in FIG. 6, the one-time number 60 might comprise a one-digit payment network ID 62, a four-digit bank (issuer) ID 64, a ten-digit transaction ID 66 and a one-digit checksum 68. The transaction ID can be a random number, a pseudorandom number or a determinant function of the user's permanent card number or other user ID and transaction details. The user sends a message to the issuer (S52) when the message includes a user ID or other data that would allow the issuer system to associate the message with a particular user, the one-time number (or just the transaction ID) and transaction details as might be needed by the issuer to verify the validity of the transaction ID. The user system and the issuer system might optionally have previously performed an authentication process so that the user system can rely on the authenticity of the messages from the user system.

As one of the online transaction interaction between the user system and the merchant system, user system will send (S53) the one-time number to the merchant and the merchant will process the transaction (S54). As part of processing the transaction, the merchant system submits (S55) a payment authorization request to the issuer system, most likely via a payment network that can determine the issuer associated with the transaction from the one-time number. For example, a merchant system might pass the one-time number to an acquirer system, which would determine an appropriate payment network from the payment ID of the one-time number and the appropriate payment network would determine the issuer involved in the transaction from the bank ID of the one-time number.

Since the issuer system had recorded the one-time number in association with a user ID in a previous step, when the issuer system receives a message containing the one-time number from the merchant system, the issuer system can match the one-time number with the user involved in the transaction (S56). The issuer system can then process the transaction (S57) in a conventional manner, such as by checking an available credit limit of the user associated with the transaction and executing optional fraud prevention procedures. The issuer system can then either approve or deny the transaction and communicate its decision to the merchant system, typically via the payment network used. The merchant can then proceed with the transaction (S58) with the user given the response from the issuer system.

Figure 6:
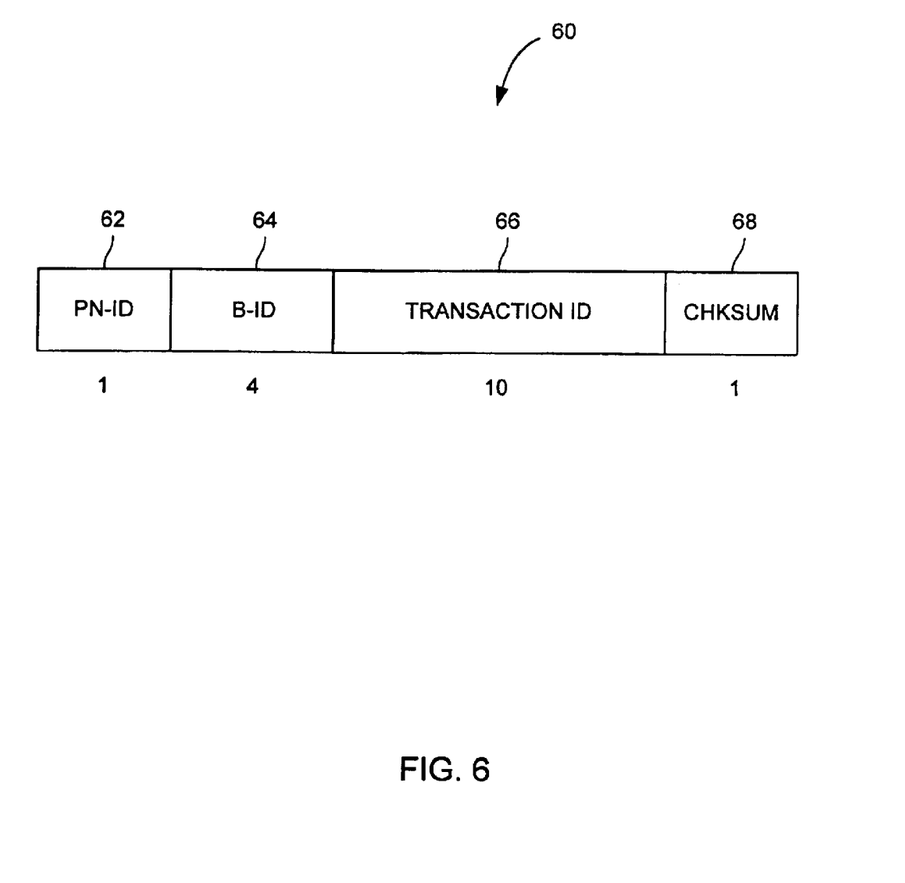
FIG. 6 is a diagram illustrating an exemplary format for a one-time number as might be used in the system described herein.

In a specific embodiment, one-time card numbers (OTNs) have the format shown in FIG. 6. As shown there, the OTN 60 comprises sixteen digits, where the sixteenth digit is a checksum. The first field 62, 64 is five digits that identify the payment network and issuer. The second field 66 is ten digits that vary from transaction to transaction, even for the same user. These ten digits are referred to herein as the "transaction identifier" or "transaction ID" 66. In other variations, the total number of digits might be more or less than sixteen, bases other than ten might be used, and the number of different issuers that are accommodated could be more or less than the five digits of the first field would accommodate.

Since the transaction ID can have one of $10^{10}$ values in the example of FIG. 6, generating a valid OTN fraudulently without all of the transaction details is not likely. Also, since the OTN does not need to code for the user uniquely, a large number of users can be supported within a given number scheme. Moreover, since the OTN is generated by the user and not the issuer, there is often less delay to the user in moving the transaction to completion. As another benefit, generating the OTN at the user system relieves the computation burden at the issuer system.

In some situations, the OTNs generated by the user might be selected from a number space that also includes valid permanent card numbers. If that were the case, the issuer would have a mechanism for identifying which numbers are OTNs and which numbers are permanent card numbers. While the future of card processing might have every transaction being a OTN transaction, where the two types of numbers coexist, mechanisms for distinguishing them should be used.

One mechanism is to assign issuer identifiers such that one issuer has at least two identifiers and each identifier handles only one type of number. Another mechanism has the user notifying the merchant that the number is a OTN and the merchant notifying the issuer.

The transaction ID can be a randomly generated value, but in some embodiments, the transaction ID is a function of user and/or transaction parameters, such as user ID, user permanent card number, expiration date, merchant ID, value limit, time limit, transaction date/time, transaction amount, etc. or combinations of one or more parameters. In yet other variations, a given OTN can be reused for a limited time, a limited number of transactions, and/or a limited value of transactions.

One-Time Passwords

The OTN apparatus and methods described above can also be used in a one-time password scheme. In such a scheme, the user system would generate a one-time password to use and pass the one-time password to an issuing system (such as a network controller) that would compare what is received from a log-in system before allowing access. For example, in a system described in U.S. patent application Ser. Nos. 09/896,560, filed Jun. 28, 2001, entitled "Methods for Pre-Authentication of Users Using One-Time Passwords," and 09/896,163, filed Jun. 28, 2001, entitled "Apparatus for Pre-Authentication of users Using One-Time Passwords," which are incorporated herein for all purposes, a user requests a one-time password from a server, and the server issues a one-time password that can be used for network access, if the server's authentication and challenges are sucessfully dealt with by the user.

Single Round-Trip Authentication

In single round-trip authentication, a client presents a message to a server and the server responds with authorization. As might be used in an online transaction system, the client might be a user system and the server might be an issuer system, whereby the issuer system authenticates the user system. To do the authentication in a single round-trip, the user generates the challenge itself instead of first requesting a challenge from the server and receiving the challenge.

Figure 7:
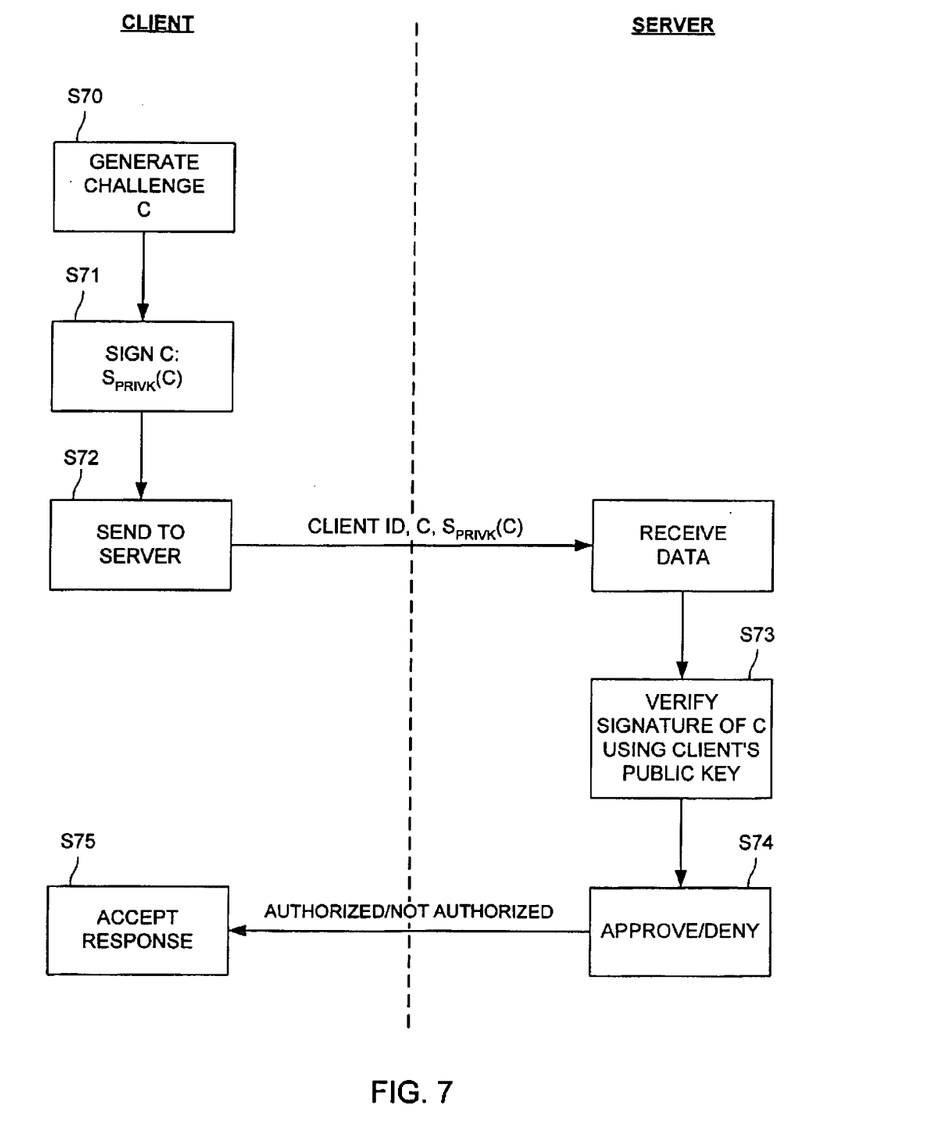
FIG. 7 is a swim diagram illustrating an authentication process between a client and a server that requires only a single round trip.

FIG. 7 is a swim diagram illustrating such a process. As shown there, the client first generates the challenge, C(S70). The client signs C using the client's private key, PRIVK, to form the challenge signature, $S_{PRIVK}(C)$. The client then sends the server (S72) the client's ID, C and $S_{PRIVK}(C)$. The server uses the client's public key, PUBK, to verify that $S_{PRIVK}(C)$ is a valid signing of C(S73). If valid, the client will be successfully authenticated (S74, S75).

In one embodiment, C is randomly generated. One drawback is that the same challenge might be reused by an interloper in a replay attack. To prevent this, C could have a sequential component according to a plan known to the server so that each new authentication request must have a different C and the server can check that C is valid as well as being properly signed. A simple embodiment has C being a running index of successive integers or a function of the client's public key, a running index, the client's ID, etc.

In another variation, the challenge is actually generated at the server, but is provided to the client in a previous authentication round. In this variation, the server chooses and sends the next challenge whenever an authentication step is performed, preferably only upon successful authentication. The first challenge, before any authentication is ever done, can be done using the previously described scheme or it can be obtained using a two round-trip process for the first round.

Figure 8:
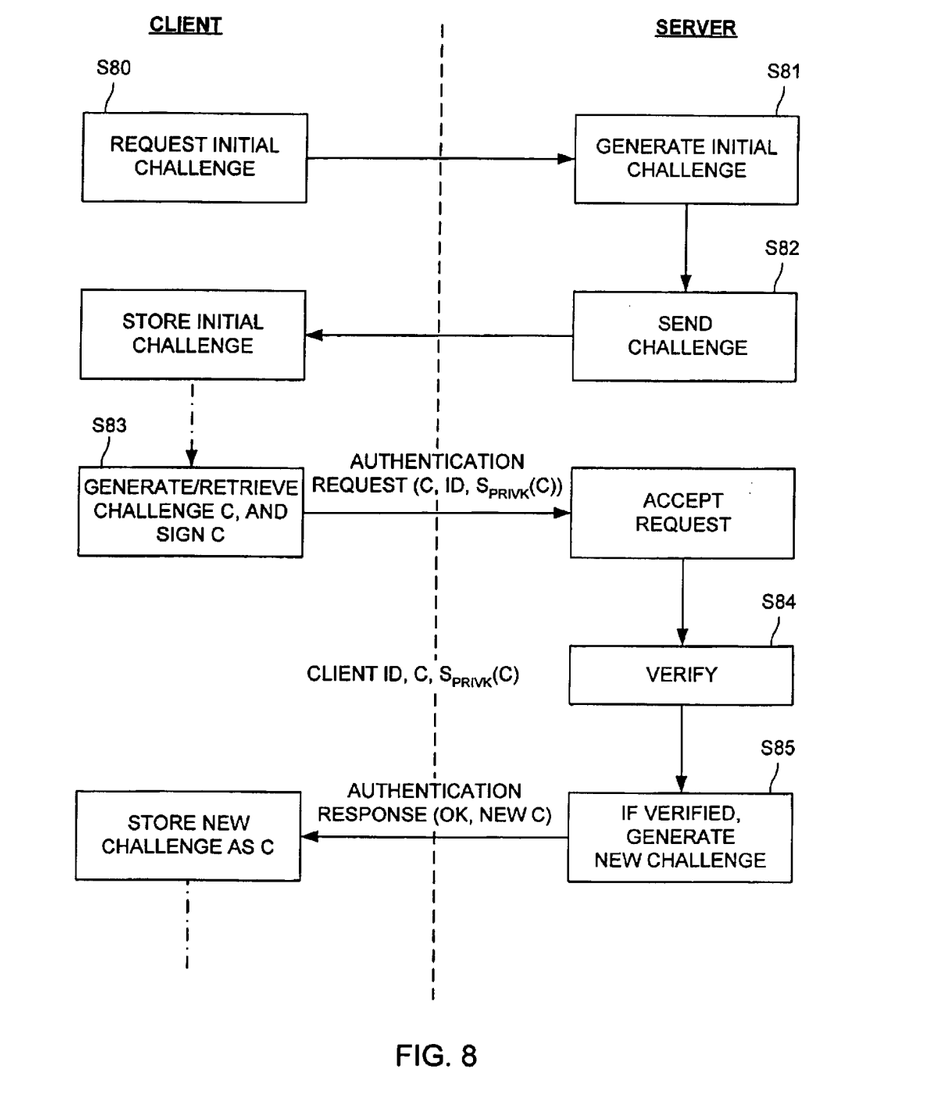
FIG. 8 is a swim diagram illustrating an alternate authentication process that requires only a single round trip after an initial authentication step.

Such a process is illustrated in FIG. 8. The first time the client requests an authentication from a particular server, the client sends a request to the server (S80) and the server generates a challenge C (S81), which is sent to the client (S82). The client signs C (S83) and sends $S_{PRIVK}(C)$ to the server. The server verifies (S84) the signed challenge and if the signing is verified (S85), the client is informed of success and is authenticated. If not, the client is informed of failure. The server includes a challenge C' with its response. The next time that client seeks to authenticate itself with that server, the client uses C' as the challenge, in a one round-trip authentication.

The user system might maintain the challenge C' and other user secrets in an encrypted form that requires a password, passkey or passphrase from the user before the data can be decrypted to a usable form. The storage for this information might be a personal computer storage element or a separable device, such as a smart card.

A novel technique for using one-time card numbers and one-round trip authentication has now been presented. The invention has now been described with reference to the preferred embodiments. Alternatives and substitutions will now be apparent to persons of skill in the art. Accordingly, it is not intended to limit the invention except as provided by the appended claims.

What is claimed is:

1. A method of authenticating a client to a server comprising:

generating a challenge at the client;

signing the challenge to form a signed challenge;

sending at least the signed challenge to the server, where the authenticity of the server is not in question;

verifying the signature of the challenge at the server; and if the signature is verified, sending an indication of successful authentication to the client, where the indication of successful authentication is generated employing a single round trip authentication scheme.

2. The method of claim 1, wherein generating a challenge at the client comprises generating a random number.

3. The method of claim 1, wherein generating a challenge at the client comprises generating a sequential challenge.

4. The method of claim 1, wherein generating a challenge at the client comprises generating a challenge based on data received from the server in a prior step.

5. The method of claim 4, wherein the data received from the server is a challenge returned with a server response to a prior client query.

6. A method of using a one-time use card number for an online transaction, comprising:

generating a one-time use card number at a user system using a random number generator;

authenticating the user system to an issuer system, where the authenticating employs a single round trip authentication scheme;

passing the one-time use card number from the user system to the issuer system;

passing the one-time use card number from the user system to a merchant system, wherein the merchant system is programmed to present the one-time use card number to the issuer system to effect a payment;

verifying the one-time use card number received from the merchant system with the one-time use card number received from the user system; and if the one-time use card number is verified, approving the transaction.

7. The method of claim 6, wherein passing the one-time use card number to the issuer includes passing at least one other data element related to the online transaction.

8. The method of claim 7, wherein the at least one other data element is selected from, or a function of, a user's account number, a user's private key, a transaction time, a transaction amount, or a merchant ID.

* * * * *